United States Patent [19]

Lau et al.

[11] 4,347,280

[45] Aug. 31, 1982

[54] SHOCK ABSORBING SHEET MATERIAL

[75] Inventors: Charles R. Lau, Key Colony Beach, Fla.; William Jensen; Perrin A. Allen, both of Norwalk, Conn.

[73] Assignee: GEOS Corporation, Stamford, Conn.

[21] Appl. No.: 281,511

[22] Filed: Jul. 8, 1981

[51] Int. Cl.³ .................... B32B 3/00; B32B 3/26; A63B 59/00; A63B 49/00

[52] U.S. Cl. .................... 428/304.4; 273/67 DB; 273/72 R; 273/75; 273/81 R; 427/245; 427/368; 427/373; 428/91; 428/95; 428/314.4; 428/316.6; 428/423.3

[58] Field of Search ............... 273/67 DB, 72 R, 75, 273/81 R, 81.4, 81.5; 428/90, 91, 95, 304.4, 309.9, 314.4, 314.8, 315.5, 315.7, 315.9, 316.6, 319.3, 319.7, 904, 423.3; 427/209, 245, 368, 373

[56] References Cited

U.S. PATENT DOCUMENTS

| | | | |
|---|---|---|---|
| 3,284,274 | 11/1966 | Hulslander et al. | 428/91 |
| 3,654,066 | 4/1972 | Fukushima et al. | 428/304.4 |
| 3,663,266 | 5/1972 | Dye | 428/315.5 |
| 3,922,402 | 11/1975 | Shimamura et al. | 428/904 |
| 3,962,512 | 6/1976 | Fontana et al. | 428/904 |
| 4,018,954 | 4/1977 | Fukushima et al. | 428/315.7 |

*Primary Examiner*—William J. Van Balen
*Attorney, Agent, or Firm*—Stephen B. Judlowe

[57] ABSTRACT

A thin, sheet material substantially aids in absorbing a mechanical impact or shock—useful in widely disparate applications, e.g., on handle/grips of sports equipment such as bats, rackets, paddles, clubs or the like. The material is formed of a three layer laminate including a central resilient fabric embedded in a low solid-content, large pore polyester or polyether urethane elastomer, bounded by large pore polyurethane of open and closed surface pore configuration, respectively.

In accordance with one aspect of the present invention, grip enhancement is effected by providing mating open surface pore urethane surfaces—as by a glove cooperating with a handle wrapping or the like.

12 Claims, 5 Drawing Figures

SHOCK ABSORBING SHEET MATERIAL

DISCLOSURE OF THE INVENTION

This invention relates to shock absorbing materials and, more specifically, to such materials which also provide grip-retention enhancement.

It is an object of the present invention to provide an improved poromeric laminate and method of forming such laminate.

More specifically, it is an object of the present invention to provide a composite polymer laminate characterized by shock/impact absorbing and grip enhancing properties.

The above and other objects of the present invention are realized in a thin, sheet material which substantially aids in absorbing a mechanical impact or shock—useful in widely disparate applications, e.g., on handle/grips of sports equipment such as bats, rackets, paddles, clubs or the like. The material is formed of a three layer laminate including a central resilient fabric embedded in a low solid-content, large pore polyether or polyester urethane, bounded by large pore polyurethane of open and closed surface pore configuration, respectively.

In accordance with one aspect of the present invention, grip enhancement is effected by providing mating open pore polyurethane surfaces—as by a glove cooperating with a handle wrapping or the like.

The above and other features and advantages will become more clear from the following detailed description of the present invention, presented hereinbelow in conjunction with the accompanying drawing, in which.

Figure 1:
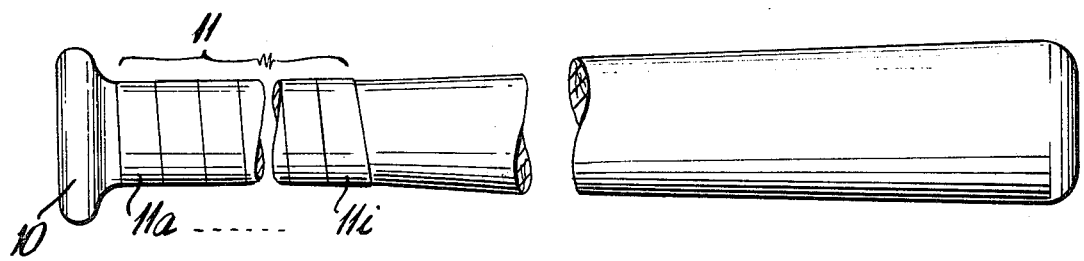
FIG. 1 is a plan view illustrating a particular application for the sheet material of the present invention.

Turning now to FIG. 1, there is shown a tape or sheet material 11 of the present invention in a useful application, i.e., applied in laps 11a, ... 11i about the handle of a baseball bat 10. The sheet material 11 may be adhered to the bat by any mechanism per se well known to those skilled in the art, e.g., by an adhesive separately applied or, preferably, formed as a layer on the bottom of tape 11 with a protective quick release cover sheet over the adhesive.

The tape 11 aids the batter (or other user of the sheet material 11 when used in other, diverse ways). First, the sheet absorbs the shocks which occur when a pitched ball is struck by the bat other than at the preferred striking point of the bat, i.e., when the ball strikes about the bat handle or bat end. This is useful per se to protect the batter's hands (particularly if an athlete is playing with some sort of minor hand injury which is often the case). It is further useful to permit full batter concentration, relieving the anxiety distraction attendant concern over the possible painful consequences of a misstruck ball.

The tape also enhances the grip of the batter—while also being sufficiently thin to retain the "feel" of the user's grip.

Figure 2:
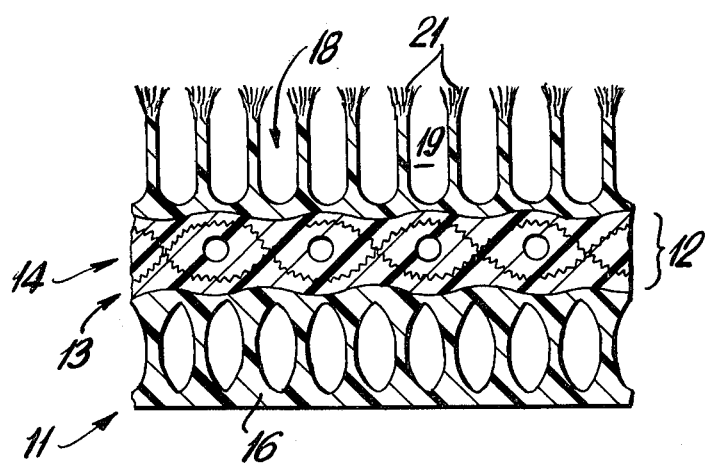
FIG. 2 depicts in cross sectional form the laminate material of the instant invention.

The impact absorbing, grip aiding sheet material 11 is shown in cross section in FIG. 2, and includes a center layer 12 formed of a textile base (e.g., a woven or non-woven fabric 13) embedded in a closed pore poromeric material, e.g., a polyether or polyester urethane. Obviously other pliant fabric forms such as a flocked mat may be employed as well.

Disposed on either side of the central layer 12 and layers 16 and 19 of a poromeric, e.g., also a polyether or polyester urethane. The upper (exposed) surface of layer 19 is buffed to open the relatively large surface pores which thus form flexible polyurethane walls 21 about pore voids 18. The upper surface of layer 19 is the active surface of material 11, i.e., the surface exposed to the user.

The impact absorbing capability of the composite laminate derives from the compressable closed and open pore construction of layers 16 and 19; the compressable nature of each of the three layers individually and the surface fibrils of layer 19; and of the coaction between layers and the boundaries in absorbing and dampening shock.

The buffed upper surface of layer 19 has a roughened, suede-like hand or feel. This per se provides a secure, slip-resisting grip. As below discussed in conjunction with FIGS. 3A-C, the grip is rendered even more secure when a cooperating buffed polyurethane material (as formed into a batter's or other glove) engages layer 19.

In accordance with one aspect of the present invention, the material 11 of FIG. 2 is made by impregnating the compressable fabric 14 with polyester or polyether urethane disposed in a dimethyl formamide (herein "DMF") carrier. A low solids content solution (approximately 6-25%, 11-12% preferred) is employed. The solids content may be substantially all polyurethane. Alternatively, up to 25% polyvinyl chloride (herein "PVC") may be utilized, an increasing amount of PVC increasing ultimate sheet 11 relative hardness. The fabric 14 may simply be passed through a polyester PVC/DMF both to take up the solution as by wicking. As is per se conventional, the DMF carrier is leached out by floating the impregnated fabric 14 through a water bath, and the solids dried as on steam rollers. Both sides of the now formed layer 12 are lightly buffed to open surface boundary area pores, roughening the respective surfaces to facilitate bonding with the layers 16 and 19.

The layers 16 and 19 are formed seriatum by wiping on a solution of polyurethane (e.g., polyester or polyether) in DMF (again, up to 25% PVC solids content may be used for the desired hardness). The total solids content may be in the range 8-30%, with approximately 16% preferred. As before, the DMF is leached out in a water bath by per se conventional water coagulation processing, and the polyurethane cured via heated rollers.

After both of the layers 16 and 19 have been formed, the layer 19 is buffed to open the pore structure, thus completing the FIG. 2 laminate.

Figure 3A:
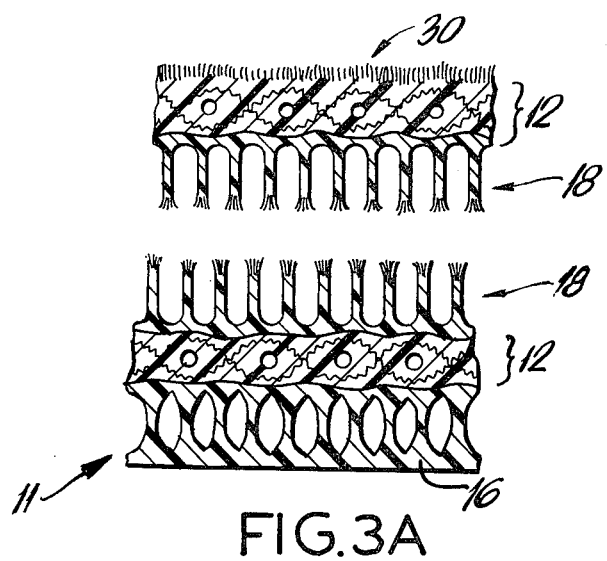
FIGS. 3A-3C are cross section views of cooperating laminate sheets shown spaced, slightly engaged and substantially engaged, respectively.
Figure 3B:
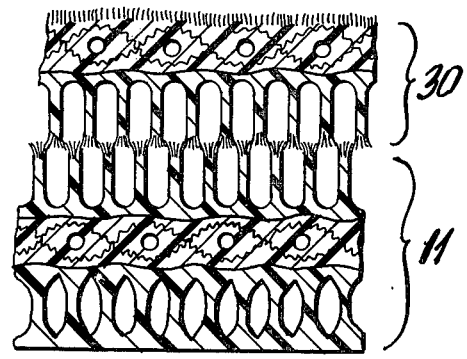
Figure 3C:
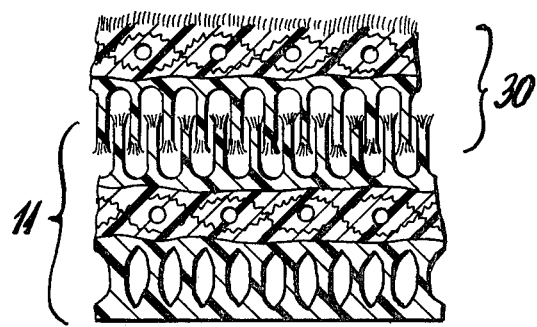

Referring now to FIG. 3A, there is shown a second poromeric sheet material 30 formed as was the sheet 11 above discussed—except that the layer 19 is not used (the layer 19 may optionally be included if enhanced impact absorption is desired for sheet 30 as well as sheet 11). As the sheets 11 and 30 become partially (FIG. 3B) and nearly full (FIG. 3C) engaged, the layer 19 walls 18 mesh and fall within the opened pores of one another—thus providing secure gripping characterized by yet improved impact absorption.

The above described specific embodiment is for purposes of illustration and not limitation. Numerous modifications, adaptions and further features thereof will be readily apparent to those skilled in the art without departing from the spirit and scope of the present invention. Thus, for example, the FIG. 2 grip construction is reversible. Further, we have found that water aids grip security—important under wet conditions or in the presence of perspiration.

What is claimed is:

1. In combination in an impact absorbing material, a laminate having a first, central layer and second and third layer adhered to opposite sides of said first layer, said first layer including a textile base disposed in polyurethane, each of said second and third layers comprising polyurethane, the surface of said second layer remote from said first layer having opened pores.

2. A combination as in claim 1 wherein at least one of said first and second laminate layers includes polyvinyl chloride.

3. A combination as in claim 1 wherein both of said first and second layers includes polyvinyl chloride.

4. A combination as in claims 1, 2 or 3 further comprising an additional laminate having first and second adhered layers, said first layer including a textile disposed in polyurethane, said second layer comprising polyurethane having opened pores on the surface thereof remote from said first layer.

5. A combination as in claim 4 wherein at least one of said first and second layers of said additional laminate includes polyvinyl chloride.

6. A combination as in claims 1, 2 or 4 wherein said textile is woven.

7. A combination as claims 1, 2 or 4 wherein said textile comprises matted filaments.

8. A method of forming an impact absorbing, grip-aiding material comprising the steps of forming a first, central layer of a composite laminate by impregnating a textile with a polyurethane in a dimethyl formamide carrier, leaching out said dimethyl formamide, drying said layer and buffing the surface of said layer, and forming second and third layers adhered to opposite side of said central layer, said second and third layers being formed by disposing polyurethane in a dimethyl formamide carrier onto said central layer, leaching out said dimethyl formamide, and drying said polyurethane, and buffing the outer surface of said second layer to create an open pore, suede-like surface.

9. A method as in claim 8, wherein said dimethyl formamide impregnating said textile includes 6–25% polyurethane.

10. A method as in claim 8 wherein said dimethyl formamide in said second and third layers includes 8–30% polyurethane.

11. A method as in claims 9 or 10, wherein said dimethyl formamide impregnating said textile includes polyvinyl chloride.

12. A method as in claims 9, 10 or 11 wherein said dimethyl formamide in said second and third layers includes polyvinyl chloride.

* * * * *